(12) United States Patent
Shih et al.

(10) Patent No.: US 11,298,853 B2
(45) Date of Patent: Apr. 12, 2022

(54) PROCESSES AND APPARATUSES FOR CONDITIONING POLYMER PARTICLES FOR AN SSP REACTOR

(71) Applicant: UOP LLC, Des Plaines, IL (US)

(72) Inventors: Raymond Shih, Elgin, IL (US); Jan De Ren, Bracknell (GB)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/130,947

(22) Filed: Dec. 22, 2020

(65) Prior Publication Data

US 2021/0107181 A1 Apr. 15, 2021

Related U.S. Application Data

(63) Continuation-in-part of application No. 16/206,992, filed on Nov. 30, 2018, which is a continuation of application No. PCT/US2017/038076, filed on Jun. 19, 2017.

(60) Provisional application No. 63/047,082, filed on Jul. 1, 2020, provisional application No. 62/352,761, filed on Jun. 21, 2016.

(51) Int. Cl.
*B29B 9/16* (2006.01)
*C08F 2/01* (2006.01)
*B29B 13/00* (2006.01)

(52) U.S. Cl.
CPC .................. *B29B 9/16* (2013.01); *C08F 2/01* (2013.01); *B29B 2009/165* (2013.01); *B29B 2013/002* (2013.01); *B29B 2013/005* (2013.01)

(58) Field of Classification Search
CPC ..... B29B 9/16; B29B 9/065; B29B 2009/165; B29B 2013/002; B29B 2013/005; C08G 63/80; C08F 2/01
See application file for complete search history.

(56) References Cited

U.S. PATENT DOCUMENTS

| | | | |
|---|---|---|---|
| 3,544,525 A | 12/1970 | Laszlo et al. | |
| 5,547,652 A | 8/1996 | Ghisolfi et al. | |
| 5,633,018 A | 5/1997 | Stouffer et al. | |

(Continued)

FOREIGN PATENT DOCUMENTS

| | | | |
|---|---|---|---|
| CN | 1101300 A | 4/1995 | |
| CN | 1178496 A | 4/1998 | |

(Continued)

OTHER PUBLICATIONS

Knunyants I.L., Chemical Encyclopedia, Soviet Encyclopedia, vol. 2, 1990, pp. 527-531.

(Continued)

*Primary Examiner* — Mary Lynn F Theisen (57) ABSTRACT

Processes and apparatuses for producing polymer particles with a solid state polycondensation reactor and an underwater pelletization unit. The apparatuses use a pre-conditioning zone to adjust a temperature, crystallization in addition to dust, acetaldehyde and water content of the particles from a crystallization bin. Various inert gas streams can be provided from a purification unit to remove dust, acetaldehyde, water and adjust temperature and crystallinity of the particles, as also move the particles. The precondition zones have stages that allow for the particles to accurately achieve the desired SSP reactor inlet conditions.

20 Claims, 5 Drawing Sheets

(56) References Cited

U.S. PATENT DOCUMENTS

| | | | |
|---|---|---|---|
| 5,714,571 | A | 2/1998 | Al Ghatta et al. |
| 5,817,747 | A | 10/1998 | Giordano et al. |
| 7,098,300 | B1 * | 8/2006 | Chen .......................... B01J 8/12 425/10 |
| 7,192,545 | B2 | 3/2007 | Ekart et al. |
| 7,521,522 | B2 | 4/2009 | Otto et al. |
| 7,557,180 | B2 * | 7/2009 | Cavaglia ................. B01J 8/003 422/131 |
| 7,868,125 | B2 | 1/2011 | DeBruin et al. |
| 7,993,557 | B2 | 8/2011 | Hanimann et al. |
| 8,039,581 | B2 | 10/2011 | Ekart et al. |
| 8,304,518 | B2 | 11/2012 | Bruckmann |
| 8,324,339 | B2 | 12/2012 | Bruckmann |
| 8,562,882 | B2 | 10/2013 | Eusebio et al. |
| 8,877,107 | B2 | 11/2014 | Hanimann et al. |
| 2005/0056961 | A1 | 3/2005 | Bonner |
| 2007/0205527 | A1 | 9/2007 | McGehee |
| 2007/0255036 | A1 | 11/2007 | Christel et al. |
| 2007/0270533 | A1 | 11/2007 | Ekart et al. |
| 2007/0274789 | A1 | 11/2007 | DeBruin et al. |
| 2009/0072423 | A1 | 3/2009 | Hanimann et al. |
| 2009/0072434 | A1 | 3/2009 | Takita et al. |
| 2009/0134537 | A1 | 5/2009 | Eloo et al. |
| 2009/0218052 | A1 | 9/2009 | DeBruin et al. |
| 2011/0245452 | A1 | 10/2011 | Ionita |
| 2012/0035342 | A1 | 2/2012 | Culbert et al. |
| 2012/0077957 | A1 | 3/2012 | Hanimann et al. |
| 2014/0084504 | A1 | 3/2014 | Christel et al. |
| 2017/0260339 | A1 | 9/2017 | Bormann et al. |
| 2019/0099919 | A1 | 4/2019 | Deren et al. |

FOREIGN PATENT DOCUMENTS

| | | | |
|---|---|---|---|
| CN | 101230130 | A | 7/2008 |
| CN | 102993419 | A | 3/2013 |
| CN | 103140337 | A | 6/2013 |
| EP | 0822214 | A2 | 2/1998 |
| GB | 1143182 | | 2/1969 |
| RU | 2446944 | | 10/2012 |
| WO | 2008009144 | A1 | 1/2008 |
| WO | 2008064768 | A1 | 6/2008 |
| WO | 2008140522 | A1 | 11/2008 |
| WO | 2016010678 | A1 | 1/2016 |
| WO | 2017222956 | A1 | 12/2017 |

OTHER PUBLICATIONS

Prokhorova A.M., Publishing House Soviet Encyclopedia, vol. 21, third edition,1975, p. 581.

De Ren, Jan et al., Chapter 7.8, UOP SINCO Solid-State Polymerization Process, Honeywell UOP, pp. 7.99-7.114, 2019. Handbook of Petrochemicals Production Processes, Second Edition, Robert A. Mayers, Ph.D.

Mills, David, Excerpts from Pneumatic Conveying Design Guide, second edition, Elsevier Butterworth Heinemann, 2004, ISBN 0 7506 5471 6.

Mills, David, Excerpts from Pneumatic Conveying Design Guide, third edition, Elsevier Butterworth Heinemann, 2016, ISBN 978-0-08-1 00649-8.

Akkil, Raj P. et al., Design of Pneumatic Conveying System, IJIRST, vol. 3, Issue 11, Apr. 2017.

Metro, Stephen M. et al., Chapter 7.8, UOP SINCO Solid-State Polymerization Process for the Production of Pet Resin and Technical Fibers, Honeywell UOP, pp. 7.99-7.114, 2004. Handbook of Petrochemicals Production Processes, First Edition, Robert A. Mayers, Ph.D.

Thiele, Ulrich K., Polyester Bottle Resins, Production, Processing, Properties and Recycling, ISBN 978-3-98079497-4-9, Heidelberg, Germany, 2007.

International Search Report from PCT application No. PCT/US2017/038076, dated Sep. 28, 2017.

Bhatia, A., Pneumatic Conveying Systems, Course No. M05-010, Continuing Education and Development, Inc., New York, NY, Jul. 2018, 57 pages.

Kapur, Aman, Simplified Pneumatic Conveying Design Guide, Class XII-A, Delhi Public School, New Delhi, Acedemia.edu, after Summer, 2016.

Chemical Enylcopedia, Scientific Publishing House for the Grand Russian Encyclopedia, Moscow, 1992, vol. 3, pp. 582, 583 (Excerpt only).

Chemical Enylcopedia, Publishing House for the Soviet Encyclopedia, Moscow, 1990, vol. 2, pp. 527-531 (Excerpt only).

Chemical Enylcopedia, Scientific Publishing House for the Grand Russian Encyclopedia, Moscow, 1995, vol. 4, pp. 47-48 (Excerpt only).

The Grand Soviet Encylopedia, second edition, ed., B.A. Vvedenskiy, State Research Institute for the Grand Soviet Encyclopedia, sent for printing Apr. 21, 1956, vol. 41, pp. 348-349 (excerpt only).

Pearl Engineering for bottle prodcuts, Technical Certificate PEPLPET B-103C PET, found on internet on Nov. 26, 2019 URL: [http://www.matweb.com/search/DataSheet.aspx?MatGUID=45144cab27fa4e48bdd508d9f8fbbd08].

Schiers, John et al., Modern Polyesters: Chemistry and Technology of Polyesters and Copolyesters, John Wiley and Sons, England, 2003, pp. 98, 159.

Aslanova, M.S. et al., Chemical Fibers, ed., Moscow, 1976, p. 114, table 5.2.

* cited by examiner

PROCESSES AND APPARATUSES FOR CONDITIONING POLYMER PARTICLES FOR AN SSP REACTOR

RELATED APPLICATIONS

This application claims priority to U.S. Provisional Patent Application No. 63/047,082, filed on Jul. 1, 2020, and is a continuation-in-part of U.S. patent application Ser. No. 16/206,992 filed on Nov. 30, 2018, which is a continuation of International Patent Application No. PCT/US2017/038076, filed on Jun. 19, 2017, which in turn claims priority to U.S. Provisional Patent Application No. 62/352,761, filed on Jun. 21, 2016, the entireties of all of which are incorporated herein by reference.

FIELD OF THE INVENTION

The present invention relates to forming and crystallizing low molecular weight polymer particles. More particularly, this invention relates to a method and apparatus for pre-conditioning polymer particles to allow for a molecular weight increasing process afterwards. Specifically, the pre-conditioning generates homogeneous crystallized polymer pellets with a desired pellet temperature for a solid state polycondensation reactor and removes some impurities like water, dust, and acetaldehyde.

BACKGROUND OF THE INVENTION

Polymer resins are molded into a variety of useful products. Useful polymer resins include aromatic polyesters of which polyethylene terephthalate (PET), polytrimethylene terephthalate (PTT), polybutylene terephthalate (PBT), polytrimethylene naphthalate (PTN), polycyclohexyl terephthalate (PCT) and polyethylene naphthalate (PEN) are examples. Polyester resins, particularly PET, copolymers of terephthalic acid with lower proportions of isophthalic acid and PBT are used in the production of beverage containers, films, fibers, packages and tire cord.

Polyester resin is conventionally produced in a melt phase polymerization (MPP) process with relatively low molecular weight inadequate for commercial uses. The molecular weight of MPP product must be upgraded. Consequently, the MPP product is formed into particles and subjected to solid state polycondensation to increase its molecular weight by maintaining the solid polymer particles at temperatures between the glass transition and the melting point temperatures while removing the reaction products under an inert gas sweep or vacuum.

A conventional PET facility includes melt plant (MP) and solid-state polymerization (SSP) unit. A melt plant produces PET polymer at 280-310° C., pelletizes and cools the PET solid to an intermediate product with intrinsic viscosity (IV) of 0.4-0.7 dL/g. This PET intermediate product was sent to silos for temporary storage at room temperature. The SSP process reheats the cold intermediate product to desired temperature typically at 200-220° C. and allow sufficient time for polymer upgrade to higher IV.

Underwater melt cutting pelletization is a method that forms solid polymer particles by quenching. This can preserve heat from melt plant to minimize re-heating in the SSP stage. Specifically, the melt polymer from the melt plant is pelletized under warm liquid medium by quenching, followed by fast separation to remove the liquid medium. The quenched product then crystallizes at elevated temperature for certain time. Sufficient crystallization is required to avoid any stickiness inside SSP reactor.

U.S. Pat. No. 8,039,581 describes a method to cut underwater melt chips and then allow PET to crystallize in liquid medium at temperature up to 190° C. However, for the underwater melt cutting product, it has been found that crystallization proceeds well, even at higher temperature. This is believed to be due to a temperature distribution/gradient within the pellet which is present for an extended time, resulting in proper nucleation, followed by primary and secondary crystallization before the temperature is equilibrated. Additionally, due to shape factor, and smooth edges of the PET pellets from underwater cutting process, the tendency to stickiness is much lower. Thus, the underwater cutting process produces PET with a higher crystallinity without stickiness and permits the PET to enter the SSP reactor at a higher temperature. However, the reactor operating temperature needs accurate control to ensure proper solid-state polymerization operation.

Therefore, there is a need for effective and efficient processes for providing particles at the desired temperature, crystallinity, and suitable impurities concentrations to an SSP reactor.

SUMMARY OF THE INVENTION

The present invention relates to an SSP reactor and processes in which the pelletization provides higher feed temperatures to SSP reactor. Achieving the proper temperature, crystallinity, and acetaldehyde, dust and water content (i.e., impurity content) is important, especially in designs which no longer have a preheater, such as those that utilize the underwater melt cutting process. Without the preheating unit in the SSP process, the temperature, crystallinity, acetaldehyde, dust, and water content may not be appropriately controlled and the pellets can be too warm or too cool for the SSP reactor. In addition, non-desired crystallization levels can result in lower reactivity and unwanted exothermic recrystallization leading to pellet agglomeration/clogging resulting in lump formation. Furthermore, excessive acetaldehyde, dust, and water content can also negatively affect the PET pellet behavior in the SSP reactor. For example, water can contribute to unwanted hydrolysis reactions, while dust may foul the reactor and other sections of the SSP unit, and too high of an acetaldehyde concentration may lead to not reaching the acetaldehyde product specification. Further, temperature may fluctuate with the underwater cutter operation and seriously affect product quality, for example crystallization kinetics and crystals morphology.

The present invention provides various solutions to these problems. Accordingly, the invention provides a pre-conditioning zone for an SSP reactor. Additionally, various methods for using the gaseous streams are provided. These provide for tight temperature and crystallinity control, in addition to acetaldehyde, water, and dust content control within or outside the reactor. It is believed that while this concept is designed for a PET solid state polymerization unit, it can be extended to similar polymer technology using underwater melt cutting (UWC) including but not limiting to polybutylene terephthalate (PBT), polynaphthalene terephthalate (PEN), polytrimethylene terephthalate (PTT) and other polyesters. The present invention provides greater control of temperature, crystallinity, acetaldehyde, water, and dust content control of particles and does so without requiring the preheater and crystallizer.

Therefore, the present invention may be characterized, in at least one aspect, as providing a pre-conditioning zone operating under a bubbling or slugging regime of fluidization for a solid-state polymerization reactor configured to provide polymerized solid polymer particles at desired solid-state polymerization reactor inlet conditions. The pre-conditioning zone may include: a particle inlet for a stream of semi-crystallized solid polymer particles; at least one gas inlet for a stream of inert gas; a particle outlet for a stream of conditioned solid polymer particles having a different temperature, or a different crystallinity, or a different acetaldehyde content, or a different water content, or a different dust content, or a combination of the foregoing compared with the semi-crystallized solid polymer particles; a gas outlet for a stream of the inert gas; and, a plurality of stages between the particle inlet and the particle outlet. The stages may be arranged along a flow path for the semi-crystallized solid polymer particles so that the semi-crystallized solid polymer particles pass from an upstream stage to a downstream stage.

The stages from the plurality of stages may be arranged at different heights along the flow path. Each stage may include a distributor for the inert gas. Each stage may include a tray, and the trays may overlap. The flow path may be a spiral shape.

Each stage may be a sloped baffle. The sloped baffles, when viewed from above, may have a circular shape.

Each stage may include a distributor for the inert gas. The stages of the plurality of stages may be separated by vertical walls between adjacent stages. The vertical walls may have different heights.

In a second aspect, the present invention may be characterized as providing a process for transferring semi-crystallized solid polymer particles from a crystallization bin to a solid-state polymerization reactor, in which the process may include: passing polymer particles to a crystallization bin to increase a level of crystallization of the polymer particles to provide semi-crystallized solid polymer particles; passing, with a stream of inert gas, semi-crystallized solid polymer particles from the crystallization bin to a pre-conditioning zone configured to adjust one or more of a temperature, a crystallinity, an acetaldehyde content, a water content, a dust content, or a combination of the foregoing of the semi-crystallized solid polymer particles; and, passing conditioned solid polymer particles from the pre-conditioning zone to the solid-state polymerization reactor to increase a level of Intrinsic Viscosity of the conditioned solid polymer particles. The pre-conditioning zone may receive an inert gas stream which is a portion of the stream of inert gas which passes the semi-crystallized solid polymer particles to the pre-conditioning zone and a portion of a gas stream from the solid-state polymerization reactor.

The process may also include passing a stream of contaminated inert gas to a purification zone configured to remove one or more contaminants from the contaminated inert gas and provide a purified stream of inert gas.

The process may also include providing a portion of the purified stream of inert gas to the pre-conditioning zone. The process may include passing a stream of inert gas from the pre-conditioning zone to the purification zone.

The process may further include providing a portion of the purified stream of inert gas to the solid-state polymerization reactor. The process may include passing a stream of inert gas from the pre-conditioning zone to the purification zone.

The pre-conditioning zone of the foregoing processes may include a plurality of stages between a particle inlet and a particle outlet, wherein the stages are arranged along a flow path for the semi-crystallized solid polymer particles so that the semi-crystallized solid polymer particles pass from an upstream stage to a downstream stage within the pre-conditioning zone. Each stage may include an inert gas inlet for a stream of the inert gas. The streams of inert gas may be passed to the stages of the pre-conditioning zone from a purification zone. Each stage may include a tray, and the trays may overlap. The flow path may be a spiral shape. Each stage may be a sloped baffle. The sloped baffles, when viewed from above, may have a circular shape. Each stage may include a distributor for the inert gas. The stages of the plurality of stages may be separated by vertical walls between adjacent stages. The vertical walls may have different heights.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures in which the same reference number between drawings refers to the same component, item, or feature and, in which.

DETAILED DESCRIPTION OF THE INVENTION

As mentioned above, the present invention provides systems and methods for providing semi-crystallized polymer particles to an SSP reactor. The present invention provides various designs to allow the temperature, crystallinity, water, aldehyde, and dust content of the semi-crystallized polymer particles to be adjusted and controlled tightly.

With these general principles in mind, one or more embodiments of the present invention will be described with the understanding that the following description is not intended to be limiting.

Figure 1:
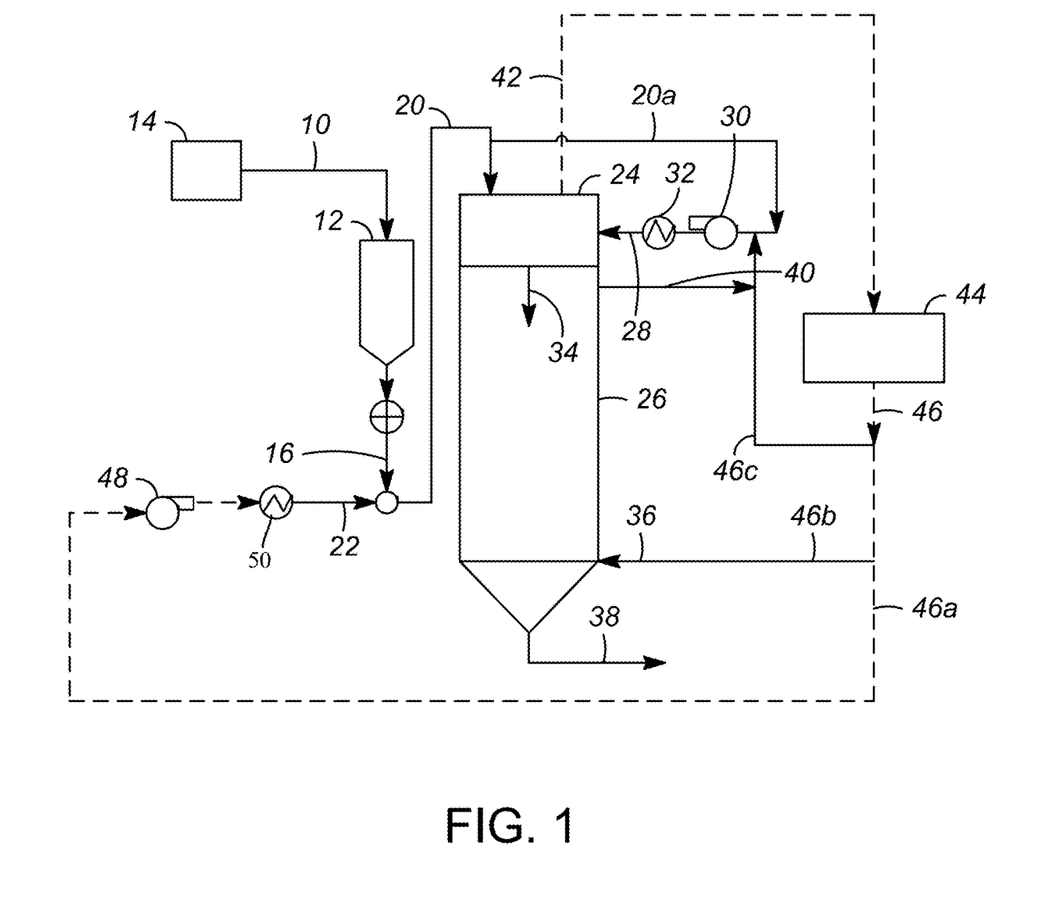
FIG. 1 shows a process flow diagram for one or more processes according to the present invention.

As shown in FIG. 1, a stream of polymer particles 10 is passed to a crystallization bin 12. Within the crystallization bin 12, the particles 10 are blanketed by an inert gas, such as nitrogen or carbon dioxide. The polymer particles 10 are provided from an underwater pelletization unit 14. Such a pelletization unit 14 forms the polymer from a resin and is described in U.S. Pub. No. 2019/0099919 and U.S. Pat. Nos. 8,324,339 and 8,304,518, the entireties of which are incorporated herein by reference.

Within the crystallization bin 12, the crystallinity of the polymer particles 10 is increased to provide a stream of semi-crystallized solid polymer particles 16. The crystallization bin 12 may have internal structures to assist solid flow. The semi-crystallized solid polymer particles 16 provided by the crystallization bin 12 should have sufficient degree of crystallization to avoid stickiness. The desired level of crystallinity for the polymer with respect to further solid stating is defined as that minimum percent crystallinity which is high enough so that further exothermic heat release in the solid stating reactor is not likely. The exact level may differ between resins. The percent crystallinity is typically estimated from the density of the granule by its buoyancy in a gradient density column according to ASTM D1505-98 "Standard Test Method for the Density of Plastics by Density-Gradient Technique," assuming 0% crystallinity (completely amorphous resin) to have a density of 1.332 g/cc and 100% crystallinity to have density of 1.455 g/cc. A typical residence time of the PET pellets in the crystallization bin 12 is between 31 to 180 minutes.

Conventionally, this requires a crystallinity of 40% or higher to safely avoid any agglomeration. However, because of the shape factor of the pellets from underwater pelletization used in the pelletization unit 14, a lower crystallinity for the semi-crystallized solid polymer particles 16 is required. The semi-crystallized solid polymer particles 16 provided by the crystallization bin 12 have up to 42% crystallinity. The polymer particles 10 are contained in the crystallization bin 12 for a sufficient residence time to crystallize to the desired level.

From the crystallization bin 12, the semi-crystallized solid polymer particles 16 are passed, with a stream of inert gas 22, such as nitrogen, to a pre-conditioning zone 24 for the SSP reactor 26.

The pre-conditioning zone 24 may be installed on top of the SSP reactor 26, internally or externally. An external pre-conditioning zone 24 may be more effective but can increase capital and plot space, while an internal pre-conditioning zone 24 may be better integrated but may increase overall height of the SSP reactor 26.

Inert gas to the pre-conditioning zone 24 removes additional water, dust, acetaldehyde, ethylene glycol or other impurities from the surface of the semi-crystallized solid polymer particles 16, and reheat or cool the semi-crystallized solid polymer particles 16 for controlling, at least partially, the temperature and crystallinity in the SSP reactor 26. The pre-conditioning zone 24 may also remove any fine dust present on the semi-crystallized solid polymer particles 16, as well as breaking up polymer lumps, if present.

The pre-conditioning zone 24 may include a baffle screen, a fluidized bed or a mechanical assisted flow device. Exemplary pre-conditioning zones 24 are discussed in more detail below in regard to FIGS. 2A, 2B, 3A, 3B, 4A, and 4B. The design of the pre-conditioning zone 24 is mostly based on the required temperature change needed for the semi-crystallized solid polymer particles 16 for the SSP reactor 26. A barrier style downslope tray (FIGS. 2A and 2B) may be used if only small temperature and crystallinity change is required, in addition to a small adjustment of dust, acetaldehyde, and water content, while a fluidized bed (FIGS. 3A and 3B and 4A and 4B) may be used if large temperature and crystallinity change is required, in addition to a small adjustment of the dust, acetaldehyde, and water content.

To adjust the temperature of the semi-crystallized solid polymer particles 16 the pre-conditioning zone 24 receives a stream of inert gas 28, which may be nitrogen. As shown in FIG. 1, a blower 30 may be used on the stream of nitrogen 28, followed by a heat exchanger 32 (or heater/cooler) which may adjust the temperature of the stream of inert gas 28. The temperature should not exceed the starting melting point for the material of the semi-crystallized solid polymer particles 16 to avoid any local melting and plug equipment in the pre-conditioning zone 24, such as a nitrogen distributor or grid plate.

As shown in FIG. 1, the stream of inert gas 28 passed to the pre-conditioning zone 24, may include a slip stream 20a of the hot lift gas from the combined stream 20 of inert gas 22 and semi-crystallized solid polymer particles 16. In addition to providing the particles with the desired temperature, the stream of inert gas 28 is used to fluidize the particles within the pre-conditioning zone 24.

From the pre-conditioning zone 24, conditioned solid polymer particles 34 are passed to the SSP reactor 26. The conditioned solid polymer particles 34 entering the SSP reactor 26 are at a temperature of about 205 to 225° C., preferably between about 210 to 220° C., which is the preferred inlet temperature of the particles entering the SSP reactor 26. However, other temperatures may be suitable.

The SSP reactor 26 is preferably a downwardly flowing SSP reactor, but a batch SSP reactor may be suitable. The conditioned solid polymer particles 34 move downwardly in the SSP reactor 26 counter-currently to the flow of hot inert gas 36, which is preferably nitrogen, to upgrade the molecular weight to the degree of polymerization of the polymer particles.

Upgraded polymer particles 38 are provided by the SSP reactor 26. A lock hopper (not shown) may be used to enable removal of the particles without depressurizing the SSP reactor 26. A gaseous effluent stream 40 comprising the inert gas 36 may be recovered from the SSP reactor 26. All, or a portion of the gaseous effluent stream 40 may be passed to the pre-conditioning zone 24 as the stream of inert gas 28. The use of the gaseous effluent stream 40 may reduce the heating requirements needed for the stream of inert gas 28.

A gaseous outlet stream 42 from the pre-conditioning zone 24, which may include contaminated gas from the combined stream 20, may be passed to a nitrogen purification unit (NPU) 44, as described in patent EP 0660746B2. The nitrogen purification unit 44 provides a cleaned nitrogen stream 46 that is cold, de-humidified, and de-dusted. As would be appreciated, if another gas is used instead of nitrogen, a different purification zone maybe utilized.

A first portion 46a of the cleaned nitrogen stream 46 may be passed to a blower 48, and then a heater 50 and used as the stream of inert gas 22 which is used as hot lift gas, passed to the crystallization bin 12. A second portion 46b of the cleaned nitrogen stream 46 may be used as the inert gas in line 36 passed to the SSP reactor 26. A third portion 46c of the cleaned nitrogen stream 46 may be used as the stream of inert 28 passed to the pre-conditioning zone 24 (along with, for example, the slip stream 20a of the hot lift gas from the stream of inert gas 22 and the gaseous effluent stream 40 from the SSP reactor 26).

In a conventional SSP unit, a nitrogen circulation system may be used to circulate purified nitrogen. The present nitrogen circulation achieves the desired oxygen purge, and impurity removal, as well as achieves an effective and efficient heat integration. For example, by using the hot nitrogen from the slip stream 20a and combining it with hot nitrogen from the SSP reactor in stream 40 and "cold" nitrogen in stream 46c from the nitrogen purification unit (NPU) 44), the heating duty requirements of the exchanger 32 are reduced and/or eliminated.

Turning to FIGS. 2A and 2B, 3A and 3B, and 4A and 4B, exemplary pre-conditioning zones 124, 224, 324 are depicted. In each of the embodiments, the same reference numerals are used for the same components or features of the pre-conditioning zones 124, 224, 324 are depicted. Generally, the pre-conditioning zones 124, 224, 324 operate under a bubbling or slugging regime of fluidization for a solid-state polymerization reactor, such as the SSP reactor 26 discussed above in FIG. 1. Thus, each of the pre-conditioning zones 124, 224, 324 is configured to provide polymerized solid polymer particles at a desired solid-state polymerization reactor inlet condition.

Figures 2A, 2B:
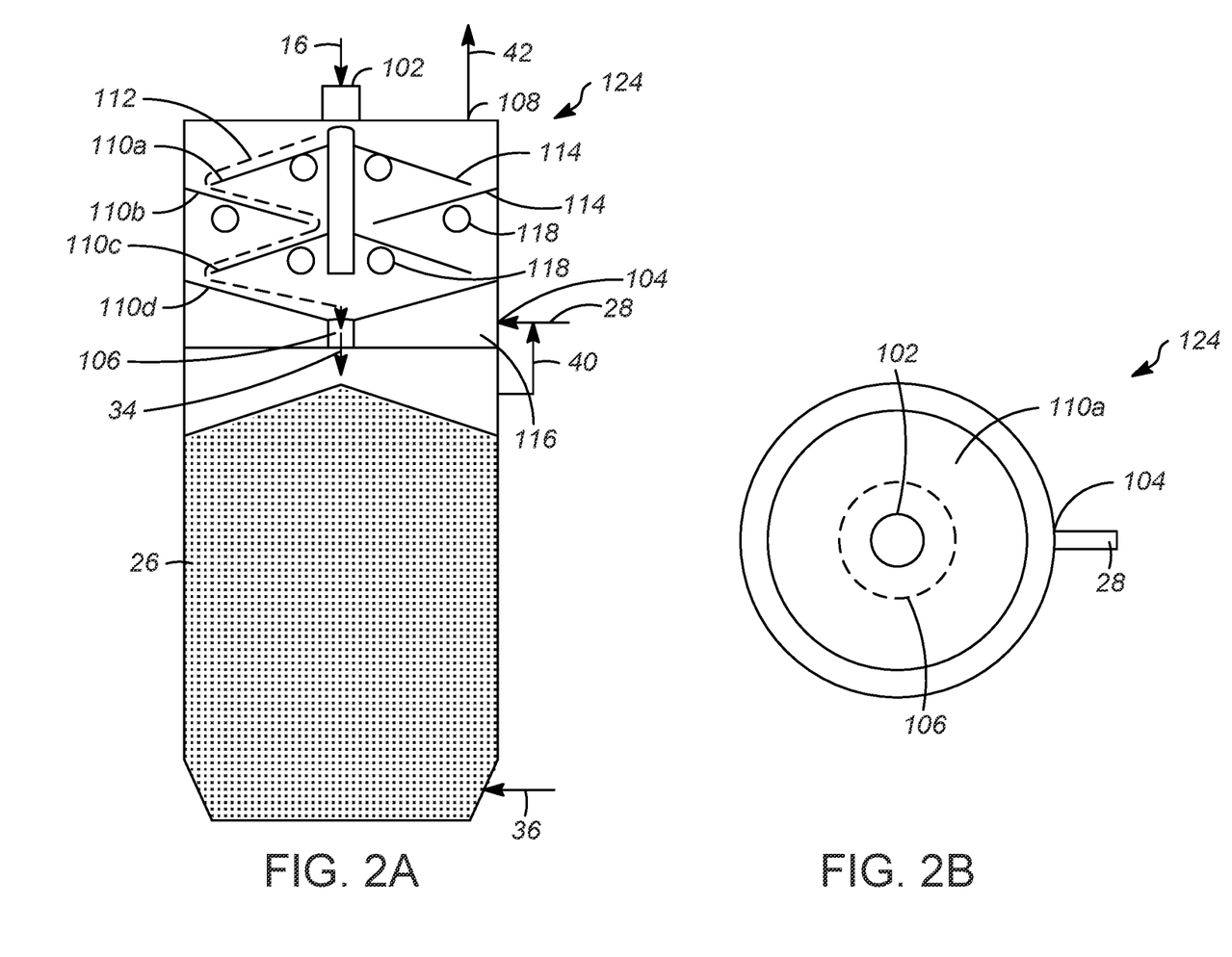
FIG. 2A shows a side schematic view of a precondition zone according to one or more aspects of the present invention.
FIG. 2B shows a top view of the precondition zone of FIG. 2A.

In FIGS. 2A and 2B, the pre-conditioning zone 124 includes a particle inlet 102 for the stream of semi-crystallized solid polymer particles 16. Additionally, the pre-conditioning zone 124 includes at least one gas inlet 104 for the stream of inert gas 28. A particle outlet 106 for a stream of the conditioned solid polymer particles 34 is also provided. The conditioned solid polymer particles 34 are semi-crystallized with a crystallinity of 35-45%, preferably 38-45%. A dust content reduction up to 100 ppmw, acetaldehyde content reduction of up to 10 ppmw, and water content reduction of up to 400 ppmw may also be achieved in the pre-conditioning zone. Additionally, the conditioned solid polymer particles 34 have a different temperature (between 0.1 to 5° C.) and crystallinity difference of 0.1-2%) compared with the semi-crystallized solid polymer particles 16. The pre-conditioning zone 124 also includes a gas outlet 108 for the gaseous outlet stream 42.

Between the particle inlet 102 and the particle outlet 106, the pre-conditioning zone 124 includes a plurality of stages 110a, 110b, 110c, 110d arranged along a flow path 112 for the semi-crystallized solid polymer particles 16 so that the semi-crystallized solid polymer particles 16 pass from an upstream stage 110a, 110b, 110c to a downstream stage 110b, 110c, 110d.

The stages 110a, 110b, 110c, 110d in FIGS. 2A and 2B are formed from porous baffles 114, such as screen trays which are sloped, annularly shaped, and/or overlapping (so that a front edge of an upstream baffle 114 is located between the front and rear edges of a downstream baffle 114). The porous baffles 114 are arranged at different heights along the flow path 112. The semi-crystallized solid polymer particles 16 flow down the sloped surface of the baffles 114 freely. Inert gas, from the stream of inert gas 28, flows upwardly from a distributor 116. Additional distributors 118 for the inert gas may be located beneath each of the baffles 114.

The inert gas strips away impurities from the surfaces of the semi-crystallized solid polymer particles 16. Additionally, the inert gas may be used to make smaller temperature adjustment (up to 5° C.), for accurate reactor temperature control, a crystallinity adjustment of up to 2%, and/or a dust content adjustment up to 100 ppmw, and/or a acetaldehyde content adjustment up to 10 ppmw and water content adjustment up to 400 ppmw. After the stages 110a, 110b, 110c, 110d, at the particle outlet 106, a rotary valve 109 (not shown in FIGS. 2A and 2B, but see FIGS. 3A and 4A) may be used to segregate the SSP reactor 26 from the pre-conditioning zone 124. It is important to move the solids out of the pre-conditioning zone 124 to avoid accumulation.

Figure 3A:
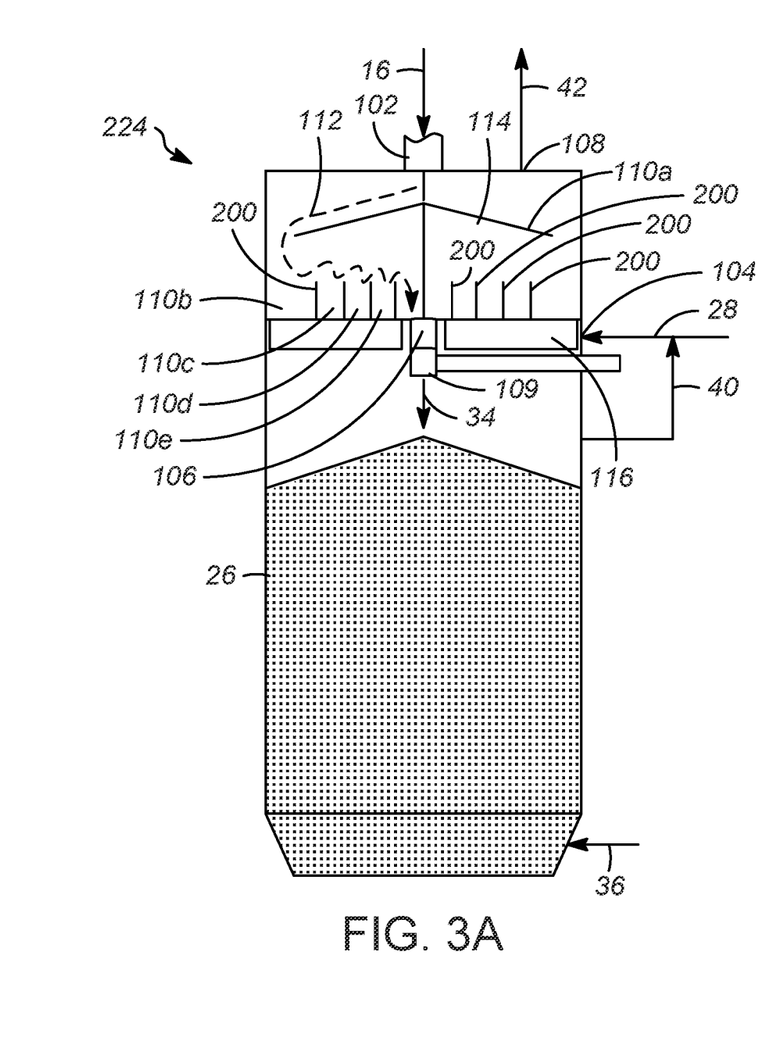
FIG. 3A shows a side schematic view of another precondition zone according to one or more aspects of the present invention.
Figure 3B:
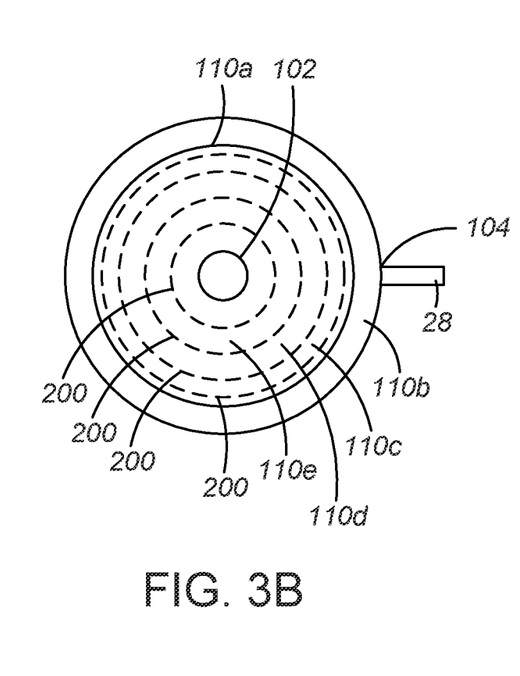
FIG. 3B shows a top view of the precondition zone of FIG. 3A.

Turning to FIGS. 3A and 3B, another pre-conditioning zone 224 is depicted. In this pre-conditioning zone 224 a first stage 110a is located at a different height from the other stages 110b, 110c, 110d, 110e which are all located at the same vertical height within the pre-conditioning zone 224. However, these stages 110b, 110c, 110d, 110e are located at different distances from the outlet 106. These stages 110b, 110c, 110d, 110e are separated from each other with vertical walls 200 which, when viewed from above are circular.

After falling of the first stage 110a, which may be a sloped baffle 114, the semi-crystallized solid polymer particles 16 fall into the downstream stages 110b, 110c, 110d, 110e. The gas from the distributor 116 will fluidize the particles and move them along through the various stages to the outlet 106 and the rotary valve 109.

This arrangement of FIGS. 3A and 3B allows for more residence time compared with the previous arrangement of FIGS. 2A and 2B. This arrangement is believed to allow for temperature adjustments of greater than 5° C. By manipulating the inlet temperature of the inert gas 28 and the height of the walls 200, the temperature, crystallinity, dust, acetaldehyde, and water content adjustment may be larger. The walls 200 may have different heights.

Figure 4A:
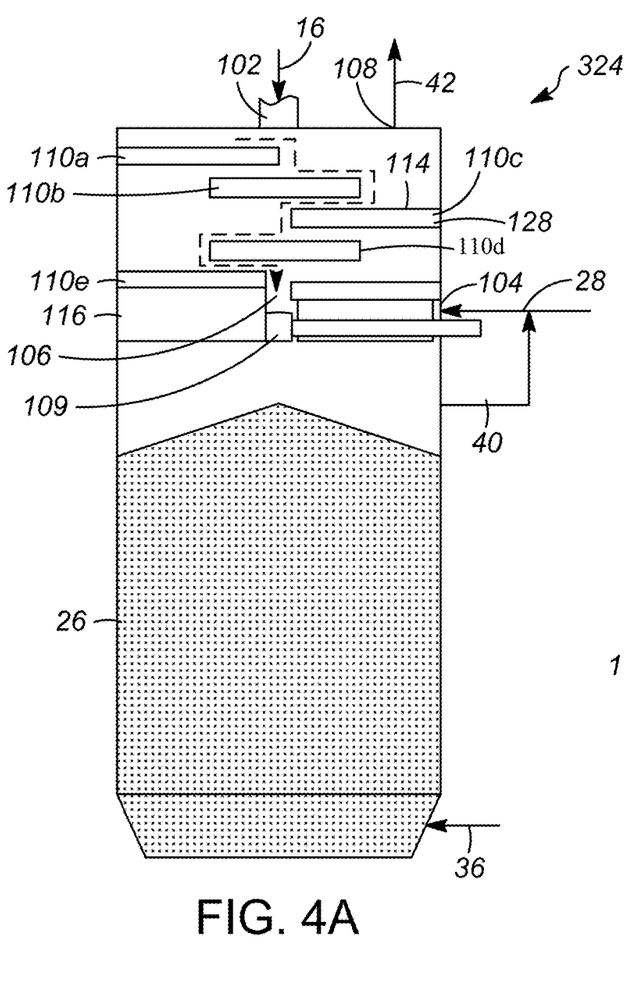
FIG. 4A shows a side schematic view of another precondition zone according to one or more aspects of the present invention.
Figure 4B:
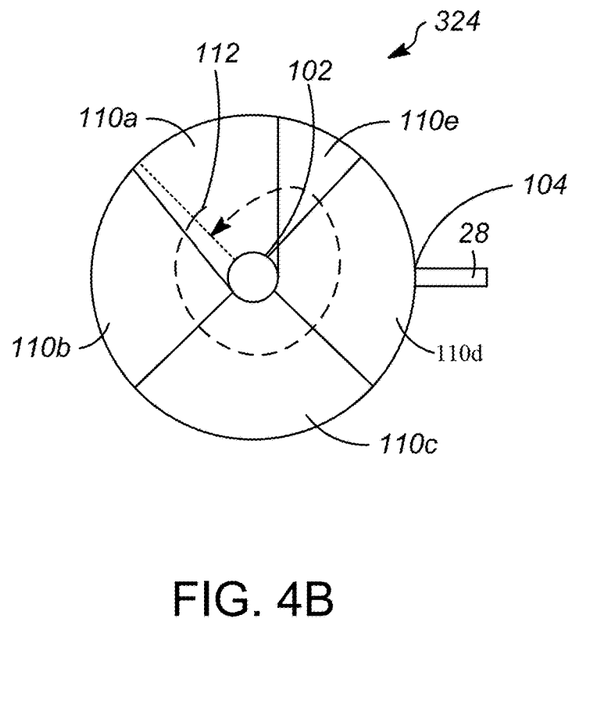
FIG. 4B shows a top view of the precondition zone of FIG. 4A.

Finally, in FIGS. 4A and 4B, the precondition zone 324 has a spiral flow path 112. Each stage 110a, 110b, 110c, 110d, 110e may be formed by porous baffles 114 that are generally horizontal, have a sector shape, when viewed from above (FIG. 4B), and which overlap. Additionally, each stage 110a, 110b, 110c, 110d, 110e may include an additional distributor 118. The spiral flow path 112 allows for an even greater residence time by increasing number of beds. Such a configuration may be used for a temperature adjustment of up to 20° C., a crystallinity adjustment of up to 5%, a water content adjustment up to 800 ppmw, and/or a dust content adjustment up to 200 ppmw, and/or a acetaldehyde content adjustment up to 30 ppmw of the semi-crystallized solid polymer particles 16.

Additional Aspects

In addition to the foregoing, additional aspects of new inventions will be described with respect to FIG. 5. As shown, a particulation and quench system 301 is serviced by cooling liquid, a crystallization and transportation section 302 is serviced by an inert gas or air, and an SSP reactor system 303 is serviced by a hot inert gas. The particulation and quench system 301 comprises a molding device 312 that receives polymer resin from a line 311. The resin in the line 311 is either already molten or the molding device 312 heats it above the melting temperature to put the polymer into the molten state. Any of several ways can be used to form the molten polymer into particles. However, it is important that the polymer particles spend relatively little time in the quench liquid and the time between particles forming and entry into the warming liquid be minimized. However, the die-face polymer cutter of GB 1,143,182 is preferred for minimizing cooling before warming.

In an embodiment, the molten polymer resin enters a pressurized chamber and is extruded though an orifice plate whose face is swept by a rotating cutter. The extruded polymer 313 enters a cooling chamber 314 through the orifices and is cut into polymer particles while quenched under pressurized cooling liquid delivered through an inlet into the chamber 314 by a line 317. In the example shown in FIG. 5 the cooling liquid entering in line 317 is water. The cooling liquid solidifies the exterior of the polymer particles while preferably leaving the interior molten. The polymer particles in the cooling liquid will be transported from the cooling chamber 314 directly to a cooling liquid removal device 316. The cooling liquid removal device may include an elbow-shaped profile screen, a dewatering cone, a centrifuge or a hydrocyclone which quickly removes polymer particles from a substantial amount of the cooling liquid. The centrifuge of the cooling liquid removal device revolves at high speed to separate the cooling liquid removed from the top thereof in a line and the polymer solids removed in a line. Higher efficiency of the separation in the cooling liquid removal device will result in higher conservation of heat in the polymer particles. Centrifuges may achieve 90% efficiency in separating liquid from solids whereas static devices may only be about 60% efficient.

The objective of the cooling liquid in the line 315 will be to facilitate forming of the polymer into solid particles which requires a lower temperature to solidify the particle exterior while not reducing the average bulk temperature of the polymer below the desired temperature for molecular weight increasing reactions for the polymer. Hence, the combination of the cooling liquid temperature and the residence time of the polymer particles in the cooling liquid between the cooling chamber 314 through the cooling liquid removal device 316 should operate such that the average bulk temperature of the polymer will not go below this temperature. The temperature of the molten polymer before quenching will be above about 260° C. and preferably at least 270° C. The temperature of the cooling liquid will typically be no more than 100° C. for PET. However, higher temperatures may be used at suitably higher pressures to avoid liquid boiling. Cooling liquid may be selected from any compatible material, preferably those which have compatibility with the polyester resin and introduce minimal degradation.

The cooling liquid is preferably water and may include additives such as ethylene glycol to raise the boiling point. However, other liquids such as related glycols may be added. The relationship of the temperature of a polymer to the amount of cooling to which it is subjected by the cooling liquid is shown in Formula (1):

$$(T_{molten} - T_q)*(mC_{Presin}) = Q_{cooling} \qquad (1)$$

wherein, $T_q$ is the average bulk temperature of the resin particle after it is removed from the cooling liquid, m is the mass flow rate of the resin, $C_{Presin}$ is the average heat capacity of resin, $Q_{cooling}$ is the heat lost during the particulation and quenching step and $T_{molten}$ is the temperature of molten polymer leaving the melt phase process in the line 311 and entering the molding device 312. It may be desirable to ensure that $T_q$ remains above the temperature at which molecular weight increasing reactions take place at a considerable rate, which is 190° C. for PET. The molding device 312, cooling chamber 314, cooling liquid removal device 316 and the screen catcher 318 (which is optional, thereby being indicated in dashed lines on FIG. 5) of the particulation and quench section may be integrally united to each other to minimize polymer cooling time and more easily maintain pressure. It is also contemplated the screen catcher may be omitted in which case the liquid removal device 316 and the crystallization bin 320 would be integrally united. Conduits connecting the units are also contemplated, but relatively long conduits will increase the degree of cooling which is undesirable.

The crystallization section 302 begins with a conduit or line 319 that delivers the particles to a crystallization bin 320 in which sufficient residence time may be given to allow the polymer particles to crystallize to the desired level. The desired level of crystallinity for the polymer with respect to further solid stating is defined as that minimum percent crystallinity which is high enough so that further exothermic heat release in the solid stating reactor is not likely. The exact level may differ between resins. The percent crystallinity is typically estimated from the density of the granule by its buoyancy in a gradient density column according to ASTM D1505-98 "Standard Test Method for the Density of Plastics by Density-Gradient Technique", assuming 0% crystallinity (completely amorphous resin) to have a density of 1.332 g/cc and 100% crystallinity to have density of 1.455 g/cc. A typical value for resin crystallinity suitable for PET copolymer in a downstream SSP is 30% to 50%. A line 321 delivers the polymer particles to the inlet of a riser 327 which transports the polymer particles up to an elevation near the top of an SSP reactor system while giving the polymer particles sufficient time to crystallize. The transport riser 327 operates in plug-flow, using a gas supplied via line 323, and, in an embodiment, with a minimum of a one-minute residence time. Shorter residence times are contemplated. The gas from line 323 is preferably hot and inert, such as nitrogen, to reduce cooling and undesirable side-reactions. Other gasses are contemplated. A line 325 delivers the effluent from an outlet of the riser 327 directly to the SSP reactor. At this point the polymer particles have achieved a crystallization roughly between 30 and 50% based on density measurement.

The crystalline polymer particles are delivered to the SSP reactor 330 in system 300. The polymer particles entering the SSP reactor system 300 are at a temperature of about 190° C. to 220° C. and preferably about 210° C. which is the preferred inlet temperature of polymer particles entering an SSP reactor 330. However, other temperatures may be suitable. The SSP reactor 330 is preferably a downwardly flowing SSP reactor, but a batch SSP reactor may be suitable. Polymer particles move downwardly in the SSP reactor 330 counter-currently to the flow of hot inert gas, which is preferably nitrogen, to upgrade the molecular weight to the degree of polymerization of the polymer particles. Inert gas may enter through a line 339 while upgraded polymer particles exit the SSP reactor 330 through a line 331. A lock hopper (not shown) may be used to enable removal of the particles without depressurizing the system. A cooling device 332 may be applied to cool the particles, using a cooling medium supplied by a line 335. The particles exit this device through an effluent line 333. However, in some conditions, the flow scheme of FIG. 5 may operate to obviate the need for cooling device 332 and deliver the upgraded polymer particles from the SSP reactor 330 directly to effluent line 333. A line 337 brings the inert gas to a gas purification and recycle system 338, preferably including a nitrogen purification unit (NPU) as described in patent EP 0660746B2, which has an effluent in line 339 that is brought back to the SSP reactor 330. In some conditions, in which the gas used in the transporting riser 327 is inert, the inert gas can be supplied from the same purification system 338 to the transporting riser 327 via line 323 (not shown).

Figure 5:
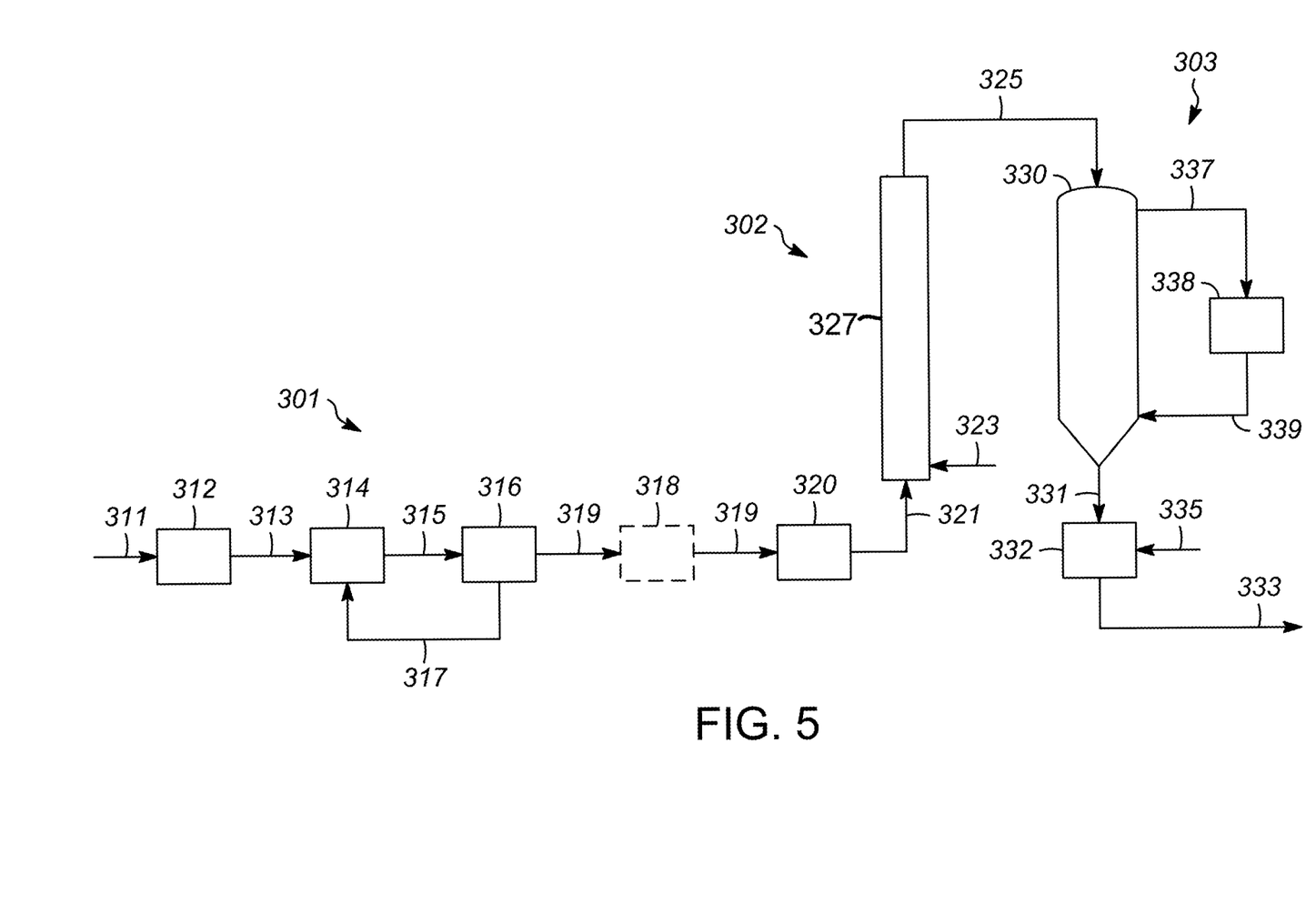
FIG. 5 is a schematic view of additional aspects of new inventions.

The flow scheme of FIG. 5 operates to minimize or eliminate the heating of the polymer particles, thus minimizing the added crystallization layer that is formed when the polymer particles are re-heated. The present invention is advantageous because by obviating the extra crystalline layer, diffusion of by-products and reduced molecular weight increasing reactions are strongly mitigated.

EXAMPLES

The following examples listed in Table 1 are intended to further illustrate the subject embodiments. These illustrations of different embodiments are not meant to limit the claims to the particular details of these examples.

TABLE 1

| PET Resin Product Properties | Conventional SSP (existing) | UWC Indirect SSP (existing) | UWC Direct SSP (patent application) |
|---|---|---|---|
| IV SSP in//out | 0.55-0.64 dL/g// 0.78-0.86 dL/g | 0.60-0.64 dL/g//0.78-0.86 dL/g | 0.55-0.75 dL/g//0.78-0.86 dL/g |
| AA in CP melt | Max. 100 ppm | Max. 50-70 ppm | Max. 70 ppm |
| AA SSP RX in | Max. 20 ppm | Max. 15 ppm | Max. 20 ppm |
| AA SSP RX out | <1 ppm | <1 ppm | <1 ppm |
| Crystallinity SSP in (after cutting) | 0-10% | 38-42% | 38-42% |
| Crystallinity SSP RX in | 40-45% | 42-45% | 38-42% |
| Crystallinity SSP RX out | 50-55% | 55-65% | 38-60% |
| Resin Clogging behavior during SSP | Limitation 210-215° C. | Limitation 210-215° C. | Limitation 225° C. |
| Reactivity @ 205° C. | ~0.0145 dL/g*h | ~0.0120-0.0140 dL/g*h (due to layer creation) | ~0.0145 dL/g*h (no layer creation) |
| Crystalline layer appearing? | No | Yes | No |
| Heat for polycondensation reactions | From Outside | From Inside & Outside | From Inside |
| Electrical Energy Consumption (600 MTD) | 60 kWh/ton | 42 kWh/ton | 29 kWh/ton (fluidized bed cooler) 13 kwh/ton (static cooler) |
| Heat Energy Consumption (600 MTD) | 63 kWh/ton | 20 kWh/ton | 8 kWh/ton |

Table 1 demonstrates the benefits of the process shown in FIG. 5. The SSP process claimed results in significant quality and flexible improvement in SSP operation, which also results in significant OPEX savings as demonstrated in Table 1. By avoiding the polyester resin reheating steps, the formation of a crystalline layer at the outside of the PET pellet is prevented. Therefore, the AA diffusion is not inhibited as compared to the UWC SSP concept where reheating results in a higher allowable AA content in the SSP feed. Furthermore, also by avoiding the formation of the crystalline layer, the final crystallinity of the PET pellets will be significantly lower than compared to other SSP concepts, resulting in energy savings for preform producers. Lower crystallinity results in heating energy savings for producing preforms, since the lower the crystallinity requires less heat to deform the structure, due to less rigid initial morphology.

Resin clogging behavior is further reduced by having a higher initial driving force (higher PET pellet resin temperature of about 30° C. to about 60° C., compared to the existing under water cutting process) which results in more homogenous crystallization behavior and consequently mitigates downstream exothermic re-crystallization, which could result in clogging. A reactivity similar to the conventional gravity flow SSP processing is expected, since as already mentioned, the crystalline layer formation in avoided in the claimed SSP process. Also, high temperature under water cutting and avoidance of reheating results in superior, homogenous properties of the PET pellets compared to other SSP concepts. The high temperature cutting is a driving force that ensures homogeneous crystallization, and the obviation of reheating results in a single crystallization regime (from inside to outside).

Further, as shown in Table 1, by eliminating the requirement for reheating, two pieces of standard process pre-conditioning equipment can be eliminated compared to the conventional gravity flow SSP processing. For example, it may be possible to eliminate equipment which was traditionally used to pre-condition the PET pellets to allow proper polycondensation in the countercurrent SSP reactor. The elimination of this equipment results in more than 50% electrical consumption savings and almost 90% heat energy savings both compared to the original SSP gravity flow process. Compared to the UWC indirect SSP process, electrical energy savings are more than 40%, and the savings in heat energy are more than 50%. In addition to the OPEX being advantageous, elimination of the two pieces of pre-conditioning equipment also results in increased flexibility, by allowing direct connection to high IV CP concepts. As illustrated in Table 1, a SSP feed ranging from 0.55 dL/g to 0.75 dL/g can be processed, whereas in previous concepts, this range was not feasible.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a pre-conditioning zone operating under a bubbling or slugging regime of fluidization for a solid-state polymerization reactor configured to provide polymerized solid polymer particles at a desired solid-state polymerization reactor inlet conditions, the pre-conditioning zone comprising a particle inlet for a stream of semi-crystallized solid polymer particles, at least one gas inlet for a stream of an inert gas, a particle outlet for a stream of conditioned solid polymer particles having a different temperature, or a different crystallinity, or a different acetaldehyde content, or a different water content, or a different dust content, or a combination of the foregoing compared with the semi-crystallized solid polymer particles; a gas outlet for a stream of the inert gas; and, a plurality of stages between the particle inlet and the particle outlet, wherein the stages of the plurality of stages are arranged along a flow path for the semi-crystallized solid polymer particles so that the semi-crystallized solid polymer particles pass from an upstream stage to a downstream stage. An embodiment of the invention is one, any or all of prior embodiments in this paragraph up through the first embodiment in this paragraph, wherein the stages from the plurality of stages are arranged at different heights along the flow path. An embodiment of the invention is one, any or all of prior embodiments in this paragraph up through the first embodiment in this paragraph, wherein each stage from the plurality of stages comprises a distributor for the inert gas. An embodiment of the invention is one, any or all of prior embodiments in this paragraph up through the first embodiment in this paragraph, wherein each stage from the plurality of stages comprises a tray, and wherein the trays overlap. An embodiment of the invention is one, any or all of prior embodiments in this paragraph up through the first embodiment in this paragraph, wherein the flow path comprises a spiral shape. An embodiment of the invention is one, any or all of prior embodiments in this paragraph up through the first embodiment in this paragraph, wherein each stage from the plurality of stages comprises a sloped baffle. An embodiment of the invention is one, any or all of prior embodiments in this paragraph up through the first embodiment in this paragraph, wherein the sloped baffles comprise, when viewed from above, a circular shape. An embodiment of the invention is one, any or all of prior embodiments in this paragraph up through the first embodiment in this paragraph, wherein each stage from the plurality of stages comprises a distributor for the inert gas. An embodiment of the invention is one, any or all of prior embodiments in this paragraph up through the first embodiment in this paragraph, wherein the stages of the plurality of stages are separated by vertical walls between adjacent stages from the plurality of stages. An embodiment of the invention is one, any or all of prior embodiments in this paragraph up through the first embodiment in this paragraph, wherein the vertical walls have different heights.

A second embodiment of the invention is a process for transferring semi-crystallized solid polymer particles from a crystallization bin to a solid-state polymerization reactor, the process comprising passing polymer particles to a crystallization bin to increase a level of crystallization of the polymer particles, a temperature of the polymer particles, or both, and provide semi-crystallized solid polymer particles; passing, with a stream of inert gas, the semi-crystallized solid polymer particles from the crystallization bin to a pre-conditioning zone configured to adjust one or more of a temperature, a crystallinity, an acetaldehyde content, a water content, a dust content, or a combination of the foregoing of the semi-crystallized solid polymer particles and provide conditioned solid polymer particles; and, passing the conditioned solid polymer particles from the pre-conditioning zone to the solid-state polymerization reactor to increase a level of Intrinsic Viscosity of the conditioned solid polymer particles, wherein the pre-conditioning zone receives an inert gas stream, the inert gas stream comprising a portion of the stream of inert gas which passes the semi-crystallized solid polymer particles to the pre-conditioning zone and a portion of a gas stream from the solid-state polymerization reactor. An embodiment of the invention is one, any or all of prior embodiments in this paragraph up through the second embodiment in this paragraph further comprising passing a stream of contaminated inert gas to a purification zone configured to remove one or more contaminants from the contaminated inert gas and provide a purified stream of inert gas. An embodiment of the invention is one, any or all of prior embodiments in this paragraph up through the second embodiment in this paragraph further comprising providing a portion of the purified stream of inert gas to the pre-conditioning zone. An embodiment of the invention is one, any or all of prior embodiments in this paragraph up through the second embodiment in this paragraph further comprising passing a stream of inert gas from the pre-conditioning zone to the purification zone. An embodiment of the invention is one, any or all of prior embodiments in this paragraph up through the second embodiment in this paragraph further comprising providing a portion of the purified stream of inert gas to the solid-state polymerization reactor. An embodiment of the invention is one, any or all of prior embodiments in this paragraph up through the second embodiment in this paragraph further comprising passing a stream of inert gas from the pre-conditioning zone to the purification zone. An embodiment of the invention is one, any or all of prior embodiments in this paragraph up through the second embodiment in this paragraph, wherein the pre-conditioning zone comprises a plurality of stages between a particle inlet and a particle outlet, and wherein the stages from the plurality of stages are arranged along a flow path for the semi-crystallized solid polymer particles so that the semi-crystallized solid polymer particles pass from an upstream stage to a downstream stage within the pre-conditioning zone. An embodiment of the invention is one, any or all of prior embodiments in this paragraph up through the second embodiment in this paragraph, wherein each stage plurality of stages comprises an inert gas inlet for a stream of the inert gas. An embodiment of the invention is one, any or all of prior embodiments in this paragraph up through the second embodiment in this paragraph, wherein the streams of inert gas are passed to the stages plurality of stages of the pre-conditioning zone from a purification zone. An embodiment of the invention is one, any or all of prior embodiments in this paragraph up through the second embodiment in this paragraph wherein each stage from the plurality of stages comprises a tray, and wherein the trays overlap.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A pre-conditioning zone operating under a bubbling or slugging regime of fluidization for a solid-state polymerization reactor configured to provide polymerized solid polymer particles at a desired solid-state polymerization reactor inlet conditions, the pre-conditioning zone comprising:
   a particle inlet for a stream of semi-crystallized solid polymer particles,
   at least one gas inlet for a stream of an inert gas,
   a particle outlet for a stream of conditioned solid polymer particles having a different temperature, or a different crystallinity, or a different acetaldehyde content, or a different water content, or a different dust content, or a combination of the foregoing compared with the semi-crystallized solid polymer particles;
   a gas outlet for a stream of the inert gas; and,
   a plurality of stages between the particle inlet and the particle outlet, wherein the stages of the plurality of stages are arranged along a flow path for the semi-crystallized solid polymer particles so that the semi-crystallized solid polymer particles pass from an upstream stage to a downstream stage.

2. The pre-conditioning zone of claim 1, wherein the stages from the plurality of stages are arranged at different heights along the flow path.

3. The pre-conditioning zone of claim 2, wherein each stage from the plurality of stages comprises a distributor for the inert gas.

4. The pre-conditioning zone of claim 3, wherein each stage from the plurality of stages comprises a tray, and wherein the trays overlap.

5. The pre-conditioning zone of claim 4, wherein the flow path comprises a spiral shape.

6. The pre-conditioning zone of claim 2, wherein each stage from the plurality of stages comprises a sloped baffle.

7. The pre-conditioning zone of claim 6, wherein the sloped baffles comprise, when viewed from above, a circular shape.

8. The pre-conditioning zone of claim 1, wherein each stage from the plurality of stages comprises a distributor for the inert gas.

9. The pre-conditioning zone of claim 8, wherein the stages of the plurality of stages are separated by vertical walls between adjacent stages from the plurality of stages.

10. The pre-conditioning zone of claim 9, wherein the vertical walls have different heights.

11. A process for transferring semi-crystallized solid polymer particles from a crystallization bin to a solid-state polymerization reactor, the process comprising:
    passing polymer particles to a crystallization bin to increase a level of crystallization of the polymer particles, a temperature of the polymer particles, or both, and provide semi-crystallized solid polymer particles;
    passing, with a stream of inert gas, the semi-crystallized solid polymer particles from the crystallization bin to a pre-conditioning zone configured to adjust one or more of a temperature, a crystallinity, an acetaldehyde content, a water content, a dust content, or a combination of the foregoing of the semi-crystallized solid polymer particles and provide conditioned solid polymer particles; and,
    passing the conditioned solid polymer particles from the pre-conditioning zone to the solid-state polymerization reactor to increase a level of Intrinsic Viscosity of the conditioned solid polymer particles,
    wherein the pre-conditioning zone receives an inert gas stream, the inert gas stream comprising a portion of the stream of inert gas which passes the semi-crystallized solid polymer particles to the pre-conditioning zone and a portion of a gas stream from the solid-state polymerization reactor.

12. The process of claim 11 further comprising:
    passing a stream of contaminated inert gas to a purification zone configured to remove one or more contaminants from the contaminated inert gas and provide a purified stream of inert gas.

13. The process of claim 12 further comprising:
    providing a portion of the purified stream of inert gas to the pre-conditioning zone.

14. The process of claim 13 further comprising:
    passing a stream of inert gas from the pre-conditioning zone to the purification zone.

15. The process of claim 12 further comprising:
    providing a portion of the purified stream of inert gas to the solid-state polymerization reactor.

16. The process of claim 15 further comprising:
    passing a stream of inert gas from the pre-conditioning zone to the purification zone.

17. The process of claim 11, wherein the pre-conditioning zone comprises a plurality of stages between a particle inlet and a particle outlet, and
    wherein the stages from the plurality of stages are arranged along a flow path for the semi-crystallized solid polymer particles so that the semi-crystallized solid polymer particles pass from an upstream stage to a downstream stage within the pre-conditioning zone.

18. The process of claim 17, wherein each stage plurality of stages comprises an inert gas inlet for a stream of the inert gas.

19. The process of claim 18, wherein the streams of inert gas are passed to the stages plurality of stages of the pre-conditioning zone from a purification zone.

20. The process of claim 18 wherein each stage from the plurality of stages comprises a tray, and wherein the trays overlap.

* * * * *